United States Patent
Skog et al.

(10) Patent No.: US 12,483,865 B2
(45) Date of Patent: Nov. 25, 2025

(54) GATEWAY NODE, USER EQUIPMENT AND METHODS THEREIN FOR HANDLING RULES AND POLICIES IN A WIRELESS COMMUNICATIONS NETWORK

(71) Applicant: Telefonaktiebolaget LM Ericsson (publ), Stockholm (SE)

(72) Inventors: Robert Skog, Hässelby (SE); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 733 days.

(21) Appl. No.: 17/794,686

(22) PCT Filed: Apr. 20, 2020

(86) PCT No.: PCT/SE2020/050399
§ 371 (c)(1),
(2) Date: Jul. 22, 2022

(87) PCT Pub. No.: WO2021/194401
PCT Pub. Date: Sep. 30, 2021

(65) Prior Publication Data
US 2023/0042754 A1    Feb. 9, 2023

(30) Foreign Application Priority Data
Mar. 23, 2020 (EP) ..................... 20382216

(51) Int. Cl.
*H04W 4/24* (2024.01)
*H04L 12/14* (2006.01)
*H04L 41/0894* (2022.01)

(52) U.S. Cl.
CPC ........... *H04W 4/24* (2013.01); *H04L 12/1407* (2013.01); *H04L 41/0894* (2022.05)

(58) Field of Classification Search
CPC .. H04W 4/24; H04L 12/1407; H04L 41/0894; H04L 67/14; H04M 15/00; H04M 15/66; H04M 15/8228
See application file for complete search history.

(56) References Cited

U.S. PATENT DOCUMENTS

2018/0006954 A1*  1/2018  Arora ................. H04L 41/0894
2020/0084829 A1*  3/2020  Tang .................. H04W 36/0011
(Continued)

OTHER PUBLICATIONS

Author Unknown, "Technical Specification Group Services and System Aspects; System Architecture for the 5G System (5GS); Stage 2 (Release 16)," Technical Specification 23.501, Version 16.2.0, Sep. 2019, 3GPP Organizational Partners, 391 pages.
(Continued)

*Primary Examiner* — Abdullahi Ahmed
(74) *Attorney, Agent, or Firm* — Withrow & Terranova, PLLC

(57) ABSTRACT

A method performed by a gateway node for handling application data traffic of a session between a UE and an application server in a wireless communications network is provided. Upon establishing the session, the gateway node obtains from a policy node, an identity identifying one or more rules provisioned for the UE. The identity is associated with the session and with a UP based API to be used for the session. The gateway node receives through the UP based API, a message from the UE. The message comprises the identity and a flow identifier identifying the application data traffic related to the identity. The message requests the one or more rules to be enforced by the gateway node. Upon detecting application data traffic associated with the flow identifier, the gateway node enforces the one or more rules, according to the obtained identity, for the detected application data traffic between the UE and the application server.

20 Claims, 13 Drawing Sheets

(56) References Cited

U.S. PATENT DOCUMENTS

| | | | | |
|---|---|---|---|---|
| 2020/0404572 A1* | 12/2020 | Siddalinga | ............... | H04L 61/58 |
| 2023/0046490 A1* | 2/2023 | Stille | ...................... | H04L 65/102 |
| 2023/0319546 A1* | 10/2023 | Lei | ........................ | H04W 72/20 |
| | | | | 370/328 |
| 2025/0063464 A1* | 2/2025 | Wei | ......................... | H04W 8/20 |

OTHER PUBLICATIONS

International Search Report and Written Opinion for International Patent Application No. PCT/SE2020/050399, mailed Jun. 30, 2020, 8 pages.

\* cited by examiner

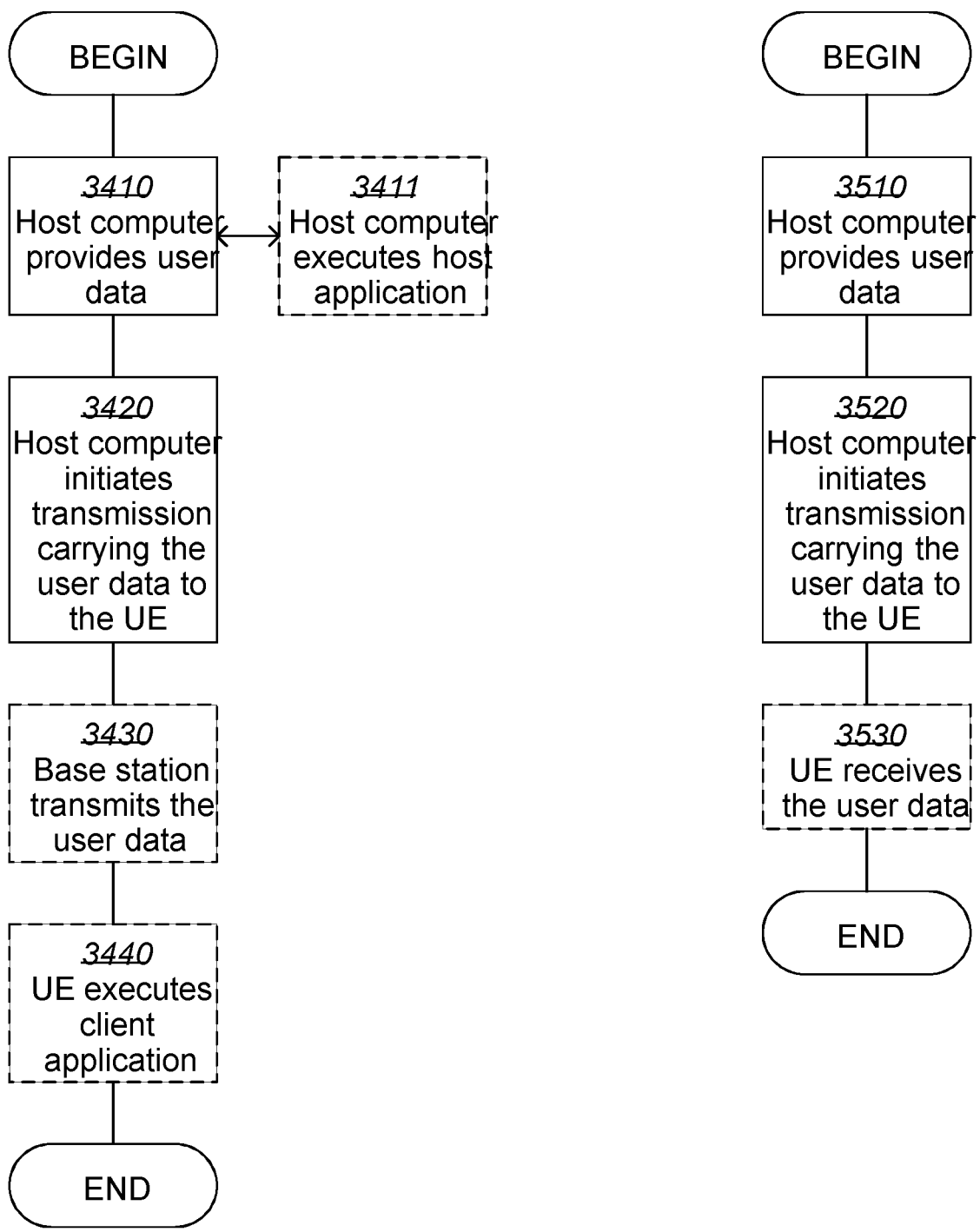

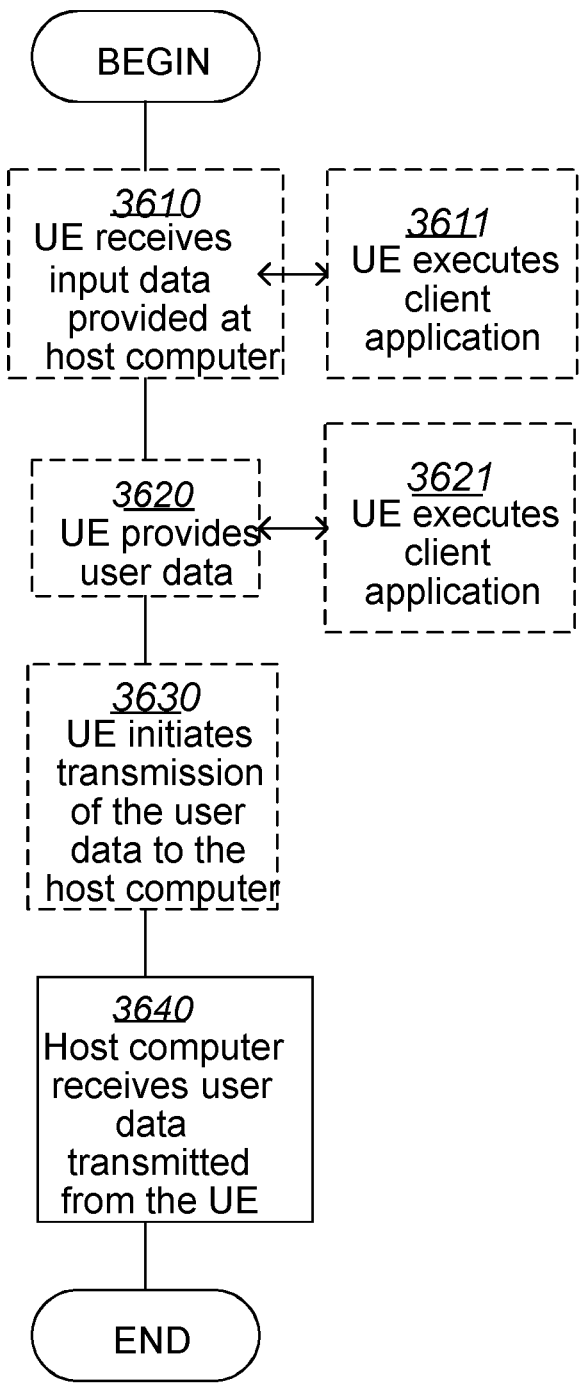
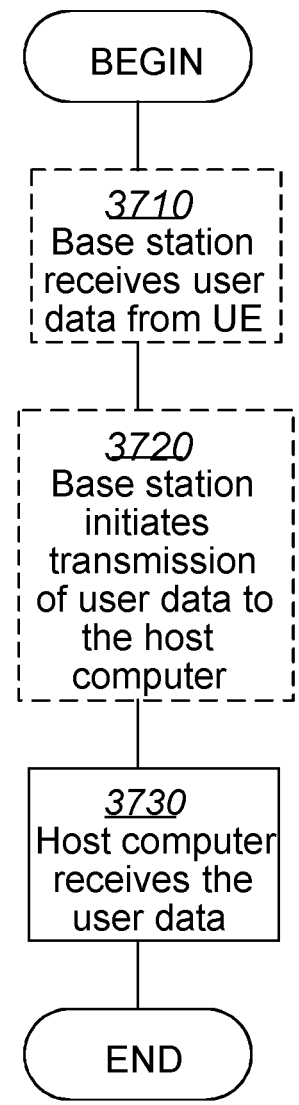
FIG 13
FIG 14

GATEWAY NODE, USER EQUIPMENT AND METHODS THEREIN FOR HANDLING RULES AND POLICIES IN A WIRELESS COMMUNICATIONS NETWORK

This application is a 35 U.S.C. § 371 national phase filing of International Application No. PCT/SE2020/050399, filed Apr. 20, 2020, which claims the benefit of European Patent Application No. 20382216.8, filed Mar. 23, 2020, the disclosures of which are incorporated herein by reference in their entireties.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of W-Fi hotspots. 5G research and development also aims at improved support of machine to machine communication, also known as the Internet of things, aiming at lower cost, lower battery consumption and lower latency than 4G equipment.

Functional elements in the 3GPP 5G core network for policy and charging The 3GPP 5G core network comprises several Network Functions (NF), some of which are discussed here. FIGS. 1a and 1b depicts 3GPP reference architecture for 5G and 3GPP 5GC reference architecture for policy and charging according to prior art.

PCF

A Policy Control Function (PCF) supports a unified policy framework to govern network behavior. The PCF provides Policy and Charging Control (PCC) rules to a Policy and Charging Enforcement Function (PCEF), e.g. a Session Management Function (SMF) and a User Plane Function (UPF), that enforces policy and charging decisions according to provisioned PCC rules.

SMF

The SMF supports different functionality, such as e.g. session establishment, modify and release, and policy related functionalities like termination of interfaces towards the PCF, charging data collection, support of charging interfaces and control and coordination of charging data collection at the UPF.

The SMF receives PCC rules from the PCF and configures the UPF accordingly through a N4 reference point, e.g. Packet Flow Control Protocol (PFCP) protocol. The SMF controls the packet processing in the UPF by establishing, modifying or deleting PFCP Sessions and by provisioning, e.g. adding, modifying or deleting, Packet Detection Rules (PDR), Forward Acton Rule (FAR), Quality of Service Enforcement Rules (QER) and/or Usage Reporting Rules (URR) per PFCP session, whereby a PFCP session may correspond to an individual PDU session or a standalone PFCP session not tied to any PDU session.

Each PDR contains a Packet Detection Information (PDI) specifying the traffic filters or signatures against which incoming packets are matched. Each PDR is associated to rules providing the set of instructions to apply to packets matching the PDI. The rules comprise one FAR, which contains instructions related to the processing of the packets, specifically forward, duplicate, drop or buffer the packet with or without notifying the control plane (CP) function about the arrival of a DL packet. Further, the rules comprise zero, one or more QERs, which comprises instructions related to the Quality of Service (QoS) enforcement of the traffic and zero, one or more URRs, which comprises instructions related to traffic measurement and reporting.

UPF

The UPF supports handling of user plane traffic based on the rules received from the SMF. The UPF performs packet inspection, through PDRs, and different enforcement actions, e.g. traffic steering, QoS, Charging/Reporting, through FARs, QERs, URRs.

NEF

3GPP has defined a framework for exposure such as e.g. a Network Exposure Function (NEF), which may comprises e.g. both internal exposure and external exposure.

The internal exposure is related to service exposure between a network operator's NFs, e.g. between the PCF and the SMF. Here the PCF may act as a consumer of SMF event exposure, referred to as Nsmf_EventExposure, service.

In contrast, external exposure is related to service exposure between a network operator's NFs, e.g. SMF or PCF, and external NFs, e.g. external Application Functions (AF). In general, this is done through NEF, which pertains to the network operator. When the external NF is trusted, the NEF may be bypassed, e.g. the AF may be a direct consumer of the Nsmf_EventExposure service. The external exposure allows collaborative solutions, which are based on the exchange of information between network operators and a content providers. Here content providers send rules to the network operator. The rules are to detect traffic related to an application that distributes content from a content provider. A content provider may be a provider providing content such as e.g. a provider of a media streaming service. The content provider may further be an application installed on a UE, such as e.g. an application providing a media streaming service.

As mentioned above, 3GPP supports the external exposure framework which allows content providers to exchange information with 3GPP-based network operators. However, one problem with the existing solution is its complexity and lack of efficiency.

SUMMARY

As part of developing embodiments herein a problem was identified by the inventors and will first be discussed.

A disadvantage is that the existing 3GPP exposure framework does not efficiently support request of rules and policies from content providers and the corresponding enforcement by network operators. This is since an external content provider, located outside an operator's domain, only sees a UE Internet Protocol (IP) address, as a UE Identity (ID), after Network Address Translation (NAT). Since the Exposure framework needs a real UE ID to handle requests of rules and policies, this means the network operator requires a system that handles a mapping between an external IP address and a real identity of a UE. This means more signaling and more internal API exposure which leads to less efficiency.

An object of embodiments herein is to improve the performance of a wireless communications network handling rules and policies related to content providers.

According to an aspect of embodiments herein, the object is achieved by a method performed by a gateway node, for handling application data traffic of a session between a User Equipment, UE, and an application server in a wireless communications network. Upon establishing the session, the gateway node obtains from a policy node, an identity identifying one or more rules provisioned for the UE. The identity is associated with the session and with a User Plane, UP, based Application Programming Interface, API, to be used for the session. The gateway node receives through the UP based API, a message from the UE. The message comprises the identity and a flow identifier identifying the application data traffic related to the identity. The message requests the one or more rules to be enforced by the gateway node. Upon detecting application data traffic associated with the flow identifier, the gateway node enforces the one or more rules, according to the obtained identity, for the detected application data traffic between the UE and the application server.

According to another aspect of embodiments herein, the object is achieved by a method performed by a User Equipment, UE, assisting a gateway node in handling application data traffic of a session between the UE and an application server in a wireless communications network. The UE sends through a User Plane, UP, based Application Programming Interface, API, a message towards the gateway node. The message comprises an identity identifying one or more rules, and a flow identifier identifying the application data traffic related to the identity. The message requests the one or more rules to be enforced by the gateway node. The UE transmits application data traffic associated with the flow identifier towards the application server through the gateway node. The sent flow identifier assists the gateway node to detect the transmitted application data traffic, and enforce the one or more rules for the detected application data traffic between the UE and the application server according to the sent identity.

According to another aspect of embodiments herein, the object is achieved by a gateway node. The gateway node is configured to handle application data traffic of a session between a User Equipment, UE, and an application server in a wireless communications network. Upon establishment of the session, the gateway node is further configured to obtain from a policy node, an identity identifying one or more rules provisioned for the UE. The identity is adapted to be associated with the session and with a User Plane, UP, based Application Programming Interface, API, to be used for the session. The gateway node is further configured to receive through the UP based API, a message from the UE. The message is adapted to comprise the identity and a flow identifier identifying the application data traffic related to the identity. The message is further adapted to request the one or more rules to be enforced by the gateway node. The gateway node is further configured to detect application data traffic associated with the flow identifier, and enforce the one or more rules, according to the obtained identity, for the detected application data traffic between the UE and the application server.

According to another aspect of embodiments herein, the object is achieved by a User Equipment, UE. The UE is configured to assist a gateway node to handle application data traffic of a session between the UE and an application server in a wireless communications network, the UE. The UE is further configured to send through a User Plane, UP, based Application Programming Interface, API, a message towards the gateway node. The message is adapted to comprise an identity identifying one or more rules, and a flow identifier identifying the application data traffic related to the identity. The message is further adapted to request the one or more rules to be enforced by the gateway node. The UE is further configured to transmit application data traffic associated with the flow identifier towards the application server through the gateway node. The sent flow identifier is adapted to assist the gateway node to detect the transmitted application data traffic, and enforce the one or more rules for the detected application data traffic between the UE and the application server according to the sent identity.

Thanks to that the gateway node obtains an identity that identifies one or more rules provisioned for the UE and that the identity is associated with the UP based API and the session to be established, and that the gateway then receives a message from the UE that comprises an identity that identifies one or more rules and a flow identifier that identifies application data traffic related to the identity, an efficient mechanism for content providers to request policies is achieved.

Embodiments herein bring the advantage of an efficient mechanism that allows content providers to request policies to the network operator through a new UP based API towards the gateway node. This this is achieved by avoiding interaction with the 5G core network control plane network functions and also avoiding the need to have a system that handles the mapping between external IP-address and UE's real identity. This results in an improved performance of the wireless communications system handling of rules and policies related to content providers.

BRIEF DESCRIPTION OF THE DRAWINGS

Examples of embodiments herein are described in more detail with reference to attached drawings in which:

FIGS. 11 to 14 are flowcharts illustrating methods implemented in a communication system including a host computer, a base station and a user equipment.

DETAILED DESCRIPTION

Embodiments herein relates to a wireless communications network and the handling of rules and policies for application data traffic related to content providers.

Some examples of embodiments herein relates to a PCC rule activation triggered by user plane events.

Example embodiments herein extend the 3GPP Exposure framework by defining an efficient mechanism allowing content providers to request policies to network operators through a new User Plane (UP) based Application Programming Interface (API) towards a gateway node, such as e.g. a UPF.

Further, embodiments herein provides an efficient mechanism allowing content providers to request policies and trigger activation of PCC rules by user plane events to the network operator through the new UP based API towards the gateway node, thereby avoiding interaction with the 5GC (5G Core) Control Plane (CP) network functions and also avoiding the need to have a system that handles the mapping between external IP address and a real identity of a UE visible to other nodes, such e.g. a NEF.

Embodiments herein implies some extensions in different 3GPP interfaces referred to as e.g. N1, N4, Nsmf, Npcf and Nudr.

Figure 1A:
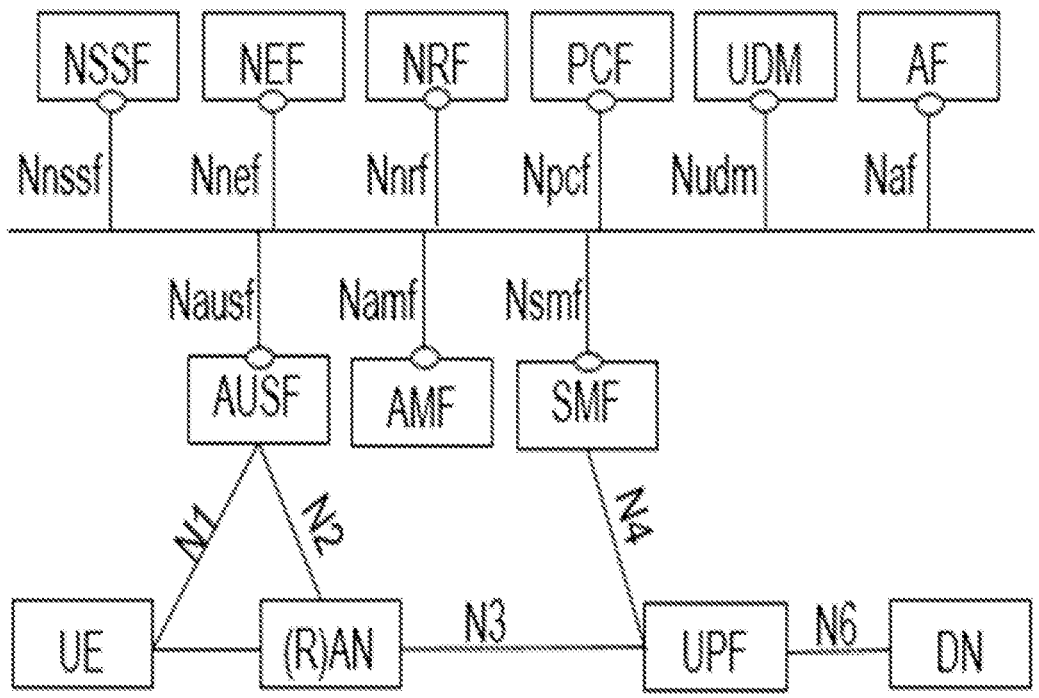
FIG. 1 a and b are schematic block diagrams illustrating prior art.
Figure 1B:
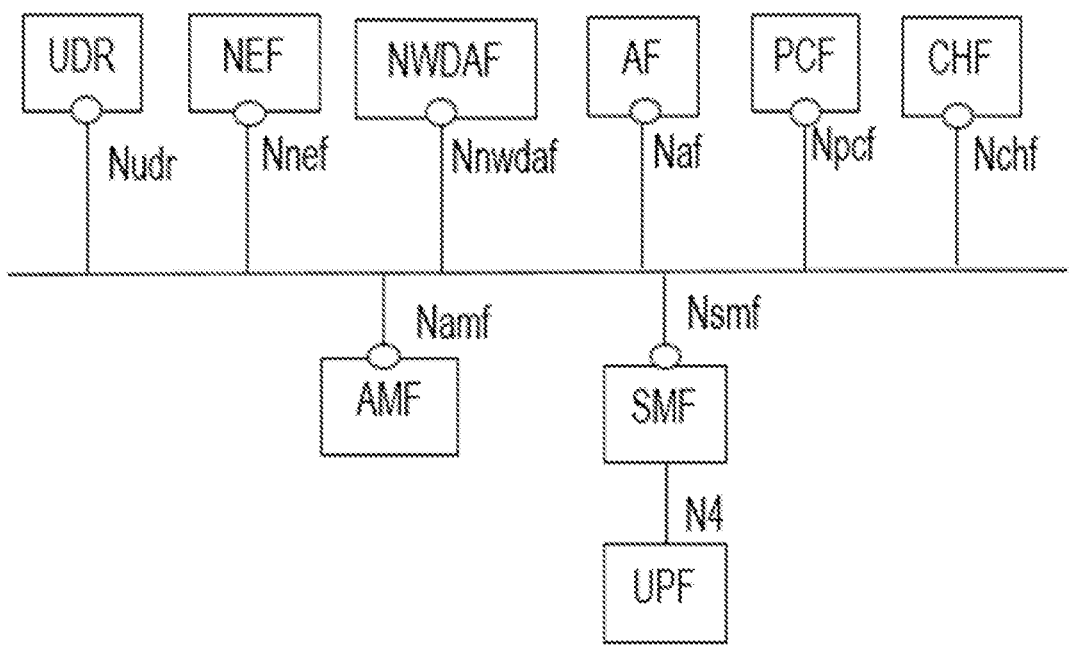
Figure 2:
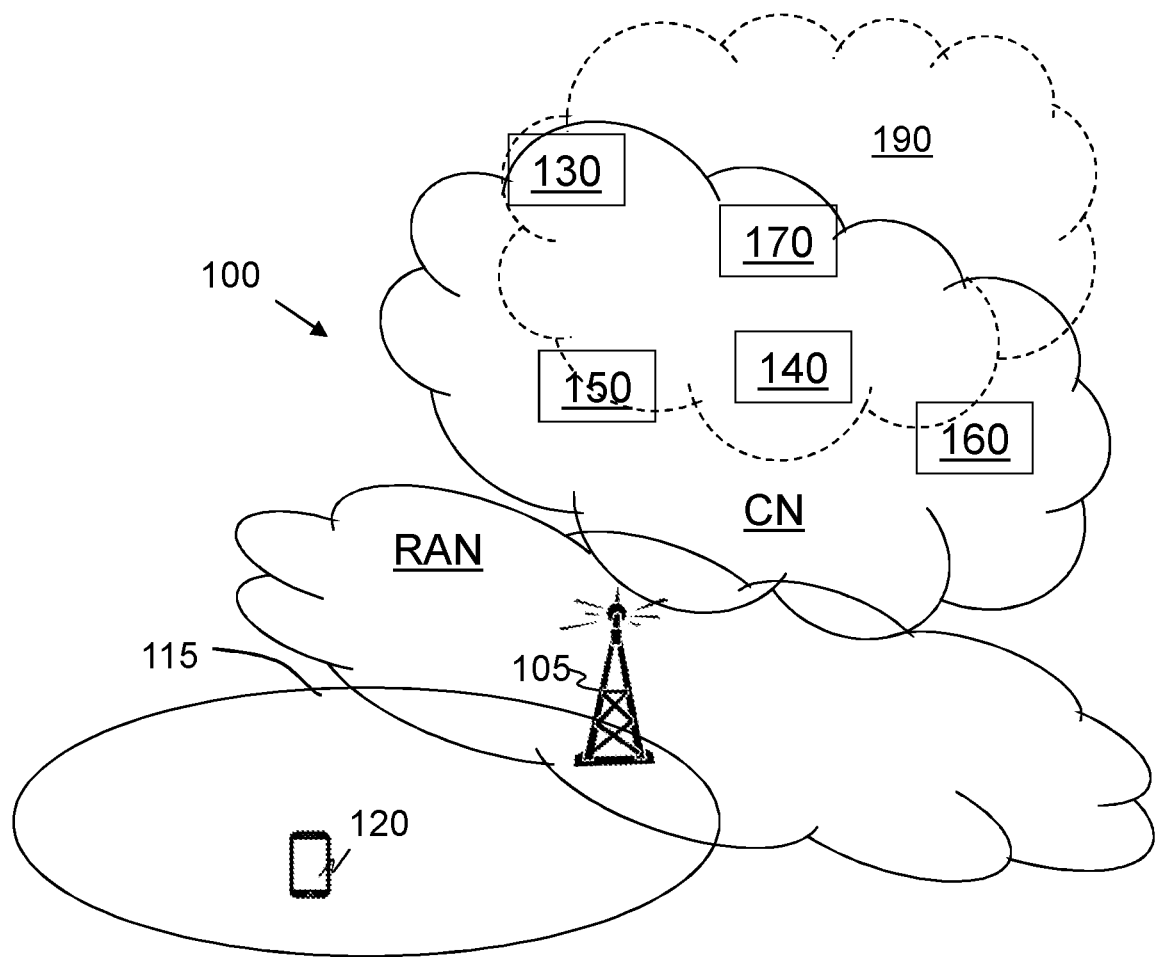
FIG. 2 is a schematic block diagram illustrating embodiments of a wireless communications network.

FIG. 2 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes such as the network node 105 operate in the wireless communications network 100. The network node 105 is a radio node and may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with a UE, such as the UE 120, within the cell 11 served by the network node 105 depending e.g. on the radio access technology and terminology used. The network node 105 may be referred to as a serving radio network node and communicates with a UE 120 with Downlink (DL) transmissions to the UE 120 and Uplink (UL) transmissions from the UE 120.

Wireless devices such as e.g. the UE 120 operate in the wireless communications network 100. The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. a network node 105, one or more Access Networks (AN), e.g. a RAN, to one or more core networks (CN). It should be understood by a skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a cell 115 provided by the network node 105.

The UE 120 may comprise a content provider such as an application installed on the UE 120, e.g. an application providing a media streaming service. Therefore, the wording "content provider" when used in the examples below may be used interchangeably with the wording "UE 120", or the wording "UE 120 such as e.g. its content provider".

A content provider may be a provider providing content such as e.g. a provider of a media streaming service. The content provider may further be an application installed on a UE, such as e.g. an application providing a media streaming service.

Among others, one or more of the following network nodes operate in the CN of the wireless communications network 100.

A gateway node 110 such as e.g. a UPF node in 5G or a PGW-U node or TDF-U node in 4G. The gateway node 110 supports handling of user plane traffic. The gateway node 110 performs packet inspection, e.g. through PDRs, and different enforcement actions, e.g. traffic steering, QoS, Charging/Reporting, e.g. through FAR, QER or URR.

A policy node 130 such as e.g. a PCF node in 5G or a PCRF node in 4G. the policy node 130 supports a unified policy framework to govern network behaviour. The policy node 130 provides PCC rules to a PCEF such as e.g. the gateway node 110 that enforces policy and charging decisions e.g. according to provisioned PCC rules.

An application server 140. The application server 140 may e.g. belong to an Over the Top (OTT) or 3rd party.

A session management node 150 such as e.g. a SMF node in 5G or a PGW-C node or TDF-C node in 4G. The session management node 150 supports different functionality, such as e.g. session establishment, modify and release, and policy related functionalities such as e.g. termination of interfaces towards the policy node 130, charging data collection, support of charging interfaces and control and coordination of charging data collection at the gateway node 110.

The session management node 150 may control packet processing in the gateway node 110 by e.g. establishing, modifying or deleting PFCP Sessions and by provisioning, e.g. adding, modifying or deleting, PDR, FAR, QER and/or URR per PFCP session, whereby a PFCP session may correspond to an individual PDU session or a standalone PFCP session not tied to any PDU session.

Each PDR contains a PDI specifying the traffic filters or signatures against which incoming packets are matched. Each PDR is associated to rules providing the set of instructions to apply to packets matching the PDI. The rules comprise one FAR, which contains instructions related to the processing of the packets, specifically forward, duplicate, drop or buffer the packet with or without notifying the control plane (CP) function about the arrival of a DL packet. Further, the rules comprise zero, one or more QERs, which comprises instructions related to the QoS enforcement of the traffic and zero, one or more URRs, which comprises instructions related to traffic measurement and reporting.

The gateway node 110, policy node 130 and session management node 150 may be owned by a network operator. The UE 120 may have a subscription with the network operator.

Methods according to embodiments herein are performed by the gateway node 110, and the UE 120. These nodes may be Distributed Nodes and functionality, e.g. comprised in a cloud 190 as shown in FIG. 2, and may be used for performing or partly performing the methods.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

Figure 3:
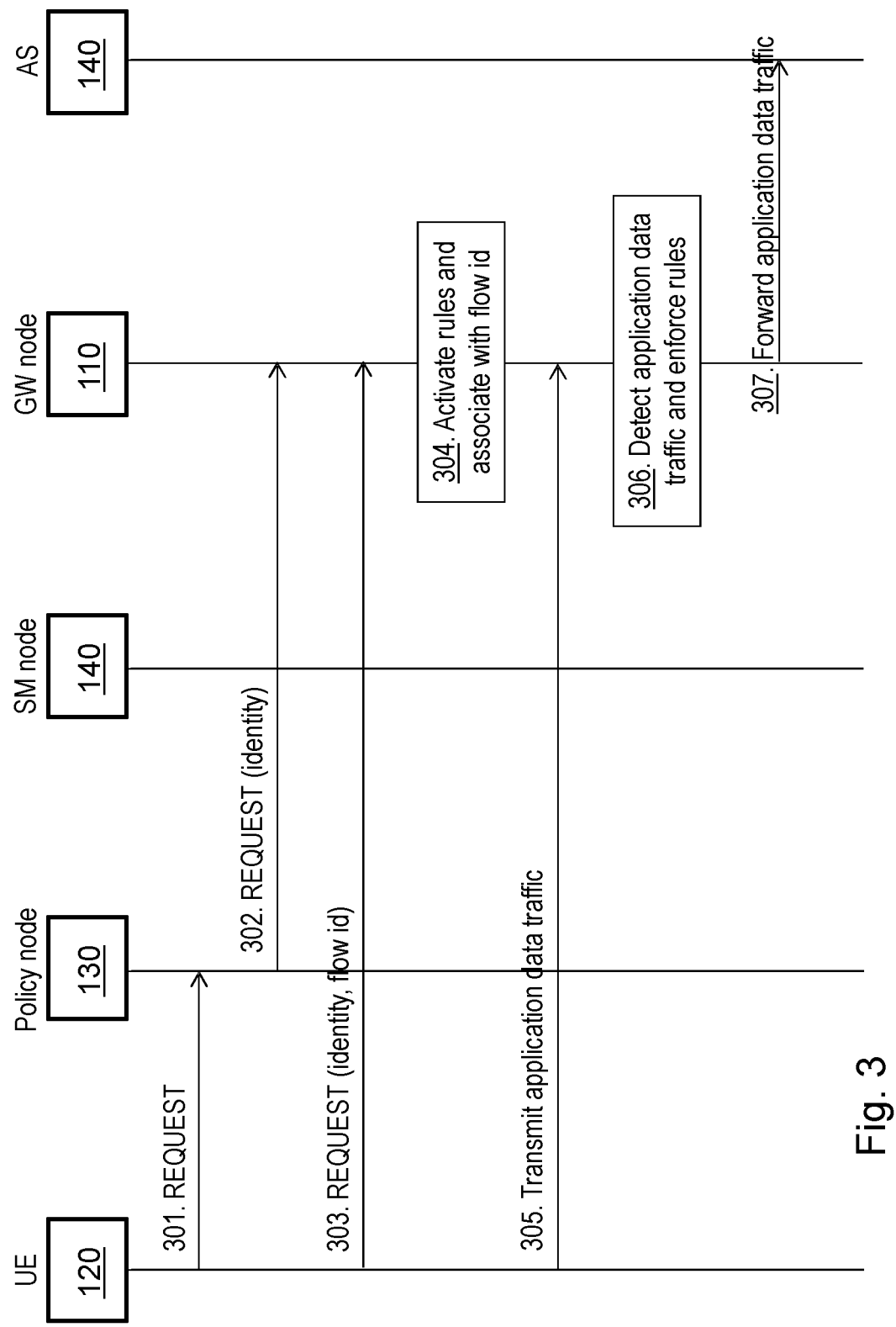
FIG. 3 is a sequence diagram illustrating example embodiments of a method.

FIG. 3 shows a signaling scheme of an example scenario of embodiments herein. During session establishment for the UE 120, the gateway node 110 communicates with the policy node 130 e.g. regarding traffic rules and policies. Upon establishing the session, the gateway node 110 communicates with the UE 120, e.g. in order to receive rules or policies to detect application data traffic. The UE 120 communicates with the application server 140, at which point the gateway node 110 may e.g. detect the application data traffic and enforce the rules or policies.

The UE 120 that wants to establish the session to communicate with the application server 140 sends 301 a request message towards the policy node 130 requesting the session to be established.

Upon receiving the request the gateway node 110 obtains 302 an identity from the policy node 130. The identity identifies one or more rules provisioned for the UE 120, such as e.g. QoS handling or charging related actions. QoS handling may comprise policies such as e.g. indicating background data which may be transmitted with lower priority, i.e. lower QoS, or indicating data to be transmitted with high priority, i.e. higher QoS. Charging related actions may comprise policies such as e.g. indicating sponsored data. Sponsored data may be data that is not charged to the user of the UE 120 e.g. by not deducting the sponsored application data traffic from a monthly quota. The identity is associated with the UE 120, the session and with the UP based API to be used for the session. This action relates to action 402 described below.

An application, such as e.g. example.com, supporting a UP based API is started on the UE 120. The UE sends 303, through the UP based API, a message to the gateway node 110. The message comprises a flow identifier and the identity, i.e. the identity identifying the one or more rules. The flow identifier will allow the gateway node 110 to identify the application data traffic corresponding to the one or more rules. The message requests that the one or more rule is enforced. This action relates to action 404 and 502 described below.

When the gateway node 110 has received the message, it may activate 304 the one or more rules and associate them with the received flow identifier. The wording activating rules when used herein means that the gateway node is prepared to enforce the one or more rules. This action relates to action 404 described below.

The UE 120 starts to transmit 305 application data traffic towards the application server 140. The application data traffic is transmitted through the gateway node 110. This action is related to action 503 described below.

Upon receiving the application data traffic, the gateway node 110 detects 306 the application data traffic based on the flow identifier. This means that the one or more rules may be applied to this flow. Based on the detected application data traffic, the gateway node enforces the one or more rules related to the identity. This action is related to actions 406 and 407 described below.

After enforcing the one or more rules related to the identity, the gateway node 110 forwards 307 the application data traffic to the application server 140.

Figure 4:
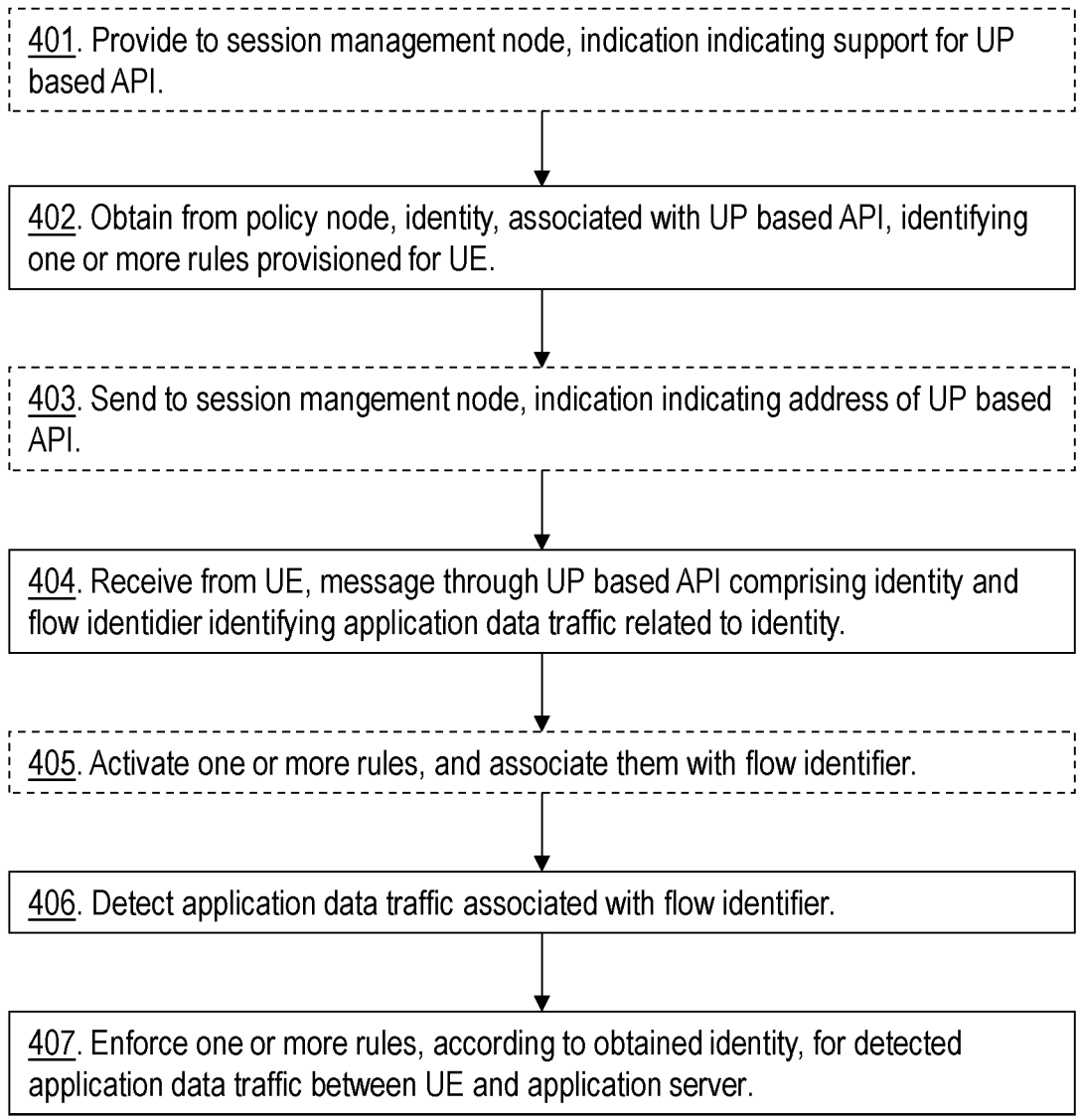
FIG. 4 is a flowchart depicting embodiments of a method in a gateway node.
Figure 5:
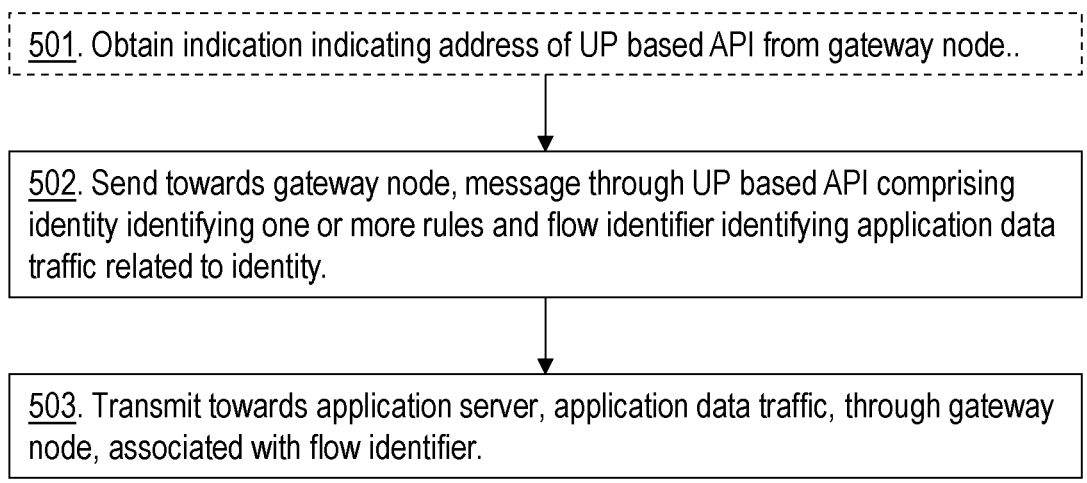
FIG. 5 is a flowchart depicting embodiments of a method in a UE.

The method according to embodiments will now be described, first from the view of the gateway node 110 together with FIG. 4, then from the view of the UE 120 together with FIG. 5.

Example embodiments of a method performed by the gateway node 110, for handling application data traffic of a session between the UE 120 and the application server 140 in the wireless communications network 100, will now be described with reference to a flowchart depicted in FIG. 4. In an example scenario a user of a UE 120 wants to use an application in the UE 120. Using the application may result in application data traffic between the UE 120 and the application server 140. The UE 120 may be connected to the wireless communications network 100 via the base station 105.

The method comprises the following actions, which actions may be taken in any suitable order. Actions that are optional are presented in dashed boxes in FIG. 4.

Action 401

During the session establishment, a session management node 150 may select the gateway node 110 to handle user plane application data traffic based on rules and policies related to the application data traffic.

Therefore, in some embodiments the gateway node 110 provides an indication to the session management node 150. The indication indicates support for the UP based API. The indication enables the session management node 150 to select the gateway node 110 for a session using the UP based API. By providing the indication to the session management node 150 that the gateway node 110 supports the UP based API, the session management node 150 knows the capabilities of the gateway node 110. This may assist the session management node 150 to select the gateway node 110 for handling a session where the UP based API will be used. The UP based API is used to by the UE 120 such as e.g. its content provider to request to a network operator owning the gateway node 110 to apply rules and policies on the UE's 120 application data traffic.

Action 402

For the UE 120 to be able to transmit application data traffic, a session needs to be established to the application server 140.

Upon establishing the session, the gateway node 110 obtains an identity from a policy node 130. The identity identifies one or more rules provisioned for the UE 120. The identity is associated with the session and with the UP based API to be used for the session. The wording an identity when used herein may mean one or more identities, each identity identifying one or more rules. The identity may be obtained from the policy node 130, through the session management node 150.

In some embodiments obtaining the identity further comprises to enable the UP based API for the session and further storing the identity identifying the one or more rules. This prepares the gateway node 110 for handling the session when the UE 120 has one or more rules associated with the UP based API provisioned.

As mentioned above, obtaining the identity may further comprise that the gateway node 110 is selected by the session management node 150 to handle the session.

In some of these embodiments the identity comprises a rule identifier. The rule identifier identifies an application associated with the rule identifier and one or more policies associated with the application. This may be the application, such as e.g. example.com, that the user of the wants to start.

In some of these embodiments the one or more rules provisioned for the UE 120 relates to traffic policies, such e.g. application data traffic policies.

As mentioned above, the one or more rules or policies may, but is not limited to, relate to QoS policies or charging policies. QoS policies may comprise e.g. indicating background data which may be transmitted with lower priority, i.e. lower QoS, or indicating data to be transmitted with high priority, i.e. higher QoS. Charging policies may comprise e.g. indicating sponsored data. Sponsored data may be data that is not charged to the user of the UE 120 e.g. by not deducting the sponsored application data traffic from a monthly quota.

Action 403

To enable the UE 120 to use the UP based API of the gateway node 110 for the session, the UE 110 needs to know where to send messages related to the UP based API.

In some embodiments, upon establishing the session, the gateway node 110 sends an indication to the session management node 150. The indication indicates the address of the UP based API handling the session. The UP based API may located in the gateway node 110. In some embodiments the address of the UP based API comprises any one out a URL, a FQDN, or an IP address of the UP based API. The IP address may further comprise a port number.

Action 404

The UE 120 sends the identity and a flow identifier in a message towards the gateway node 110 to assist the gateway node 110 to detect and identify the application data traffic related to the application.

The gateway node 110 receives through the UP based API, a message from the UE 120. The message comprises the identity and a flow identifier identifying the application data traffic related to the identity.

In order to apply the one or more rules related to the identity that is associated to the UP based API, the one or more rules may need to be enforced.

Thus the message requests the one or more rules to be enforced by the gateway node 110.

Action 405

In some embodiments, following receiving the identity and flow identifier, the gateway node 110 activates the one or more rules, and associate the one or more rules with the flow identifier.

Action 406

When the application of the UE 120 is started, application data traffic is transmitted towards the application server 140 through the gateway node 110.

The gateway node 110 detects application data traffic associated with the flow identifier. Since the gateway node 130 has the received flow identifier, the gateway node can detect and distinguish application data traffic from data traffic not related to the application of the UE 120.

Action 407

Upon the detecting application data traffic with its associated flow identifier, the gateway node 110 enforces the one or more rules for the detected application data traffic between the UE 120 and the application server 140. The one or more rules are enforced according to the obtained identity. Since the flow identifier identifies application data traffic related to the received identity, the gateway node 110 may enforce the one or more rules identified by the identity.

In this way, an efficient mechanism for content providers to request policies triggered by user plane events is achieved.

Example embodiments of a method performed by the UE 120 for assisting the gateway node 110 in handling application data traffic of a session between the UE 120 and the application server 140 in the wireless communications network 100, will now be described with reference to a flowchart depicted in FIG. 5. In an example scenario a user of a UE 110 wants to use an application in the UE 120. Using the application may result in application data traffic between the UE 120 and the application server 140. The UE may be connected to the wireless communications network 100 via the base station 105.

The method comprises the following actions, which actions may be taken in any suitable order. Actions that are optional are presented in dashed boxes in FIG. 5.

Action 501

To enable the UE 120 to use the UP based API for a session, the UE 110 may need to know where to send messages related to the UP based API.

In some embodiments, upon establishing the session, the UE 120 obtains an indication from the gateway node 110. The indication may be received via the session management node 150. The indication indicates an address of the UP based API handling the one or more rules for the session. Indicating an address when used herein may comprise a complete address or parts of an address. In some of these embodiments the obtaining of the indication further comprises that the UE 120 stores the address of the UP based API handling the one or more rules for the session. An address may be of different types, and in some of these embodiments the address of the UP based API comprises any one out a URL, a FQDN, or an IP address of the UP based API. The IP address may further comprise a port number. In some of these embodiments the address will then be used as destination address for sending the message to the UP based API in action 502 below.

Action 502

The UE 120 sends a message towards the UP based API of gateway node 110, e.g. by using the address obtained from the gateway node 110, to assist the gateway node 110 to detect and identify the application data traffic related to the application.

The UE 120 sends through the UP based API a message towards the gateway node 110. The message comprises an identity identifying one or more rules, and a flow identifier identifying the application data traffic related to the identity.

In order for the one or more rules related to the identity that is associated to the UP based API to be applied by the gateway node 110, the one or more rules may need to be enforced.

Therefore the message requests the one or more rules to be enforced by the gateway node 110.

In some of these embodiments the identity comprises a rule identifier, which rule identifier identifies the application, such as e.g. example.com, associated with the rule identifier and one or more policies associated with the application.

In some of these embodiments the one or more rules relates to traffic policies, such e.g. application data traffic policies.

As mentioned above, the one or more rules or policies may, but is not limited to, relate to QoS policies or charging policies. QoS policies may comprise e.g. indicating background data which may be transmitted with lower priority. Charging policies may comprise e.g. indicating sponsored data. Sponsored data may be data that is not charged to the user of the UE 120 e.g. by not deducting the sponsored application data traffic from a monthly quota.

Action 503

When the application of the UE 120 is started, application data traffic is transmitted towards the application server 140 through the gateway node 110.

The UE 120 transmits application data traffic associated with the flow identifier towards the application server 140 through the gateway node 110. The sent flow identifier assists the gateway node 110 to detect the transmitted application data traffic, and enforce the one or more rules for the detected application data traffic between the UE 120 and the application server 140 according to the sent identity.

Embodiments herein such as mentioned above will now be further described and exemplified. The text below is applicable to and may be combined with any suitable embodiment described above.

Figure 6A:
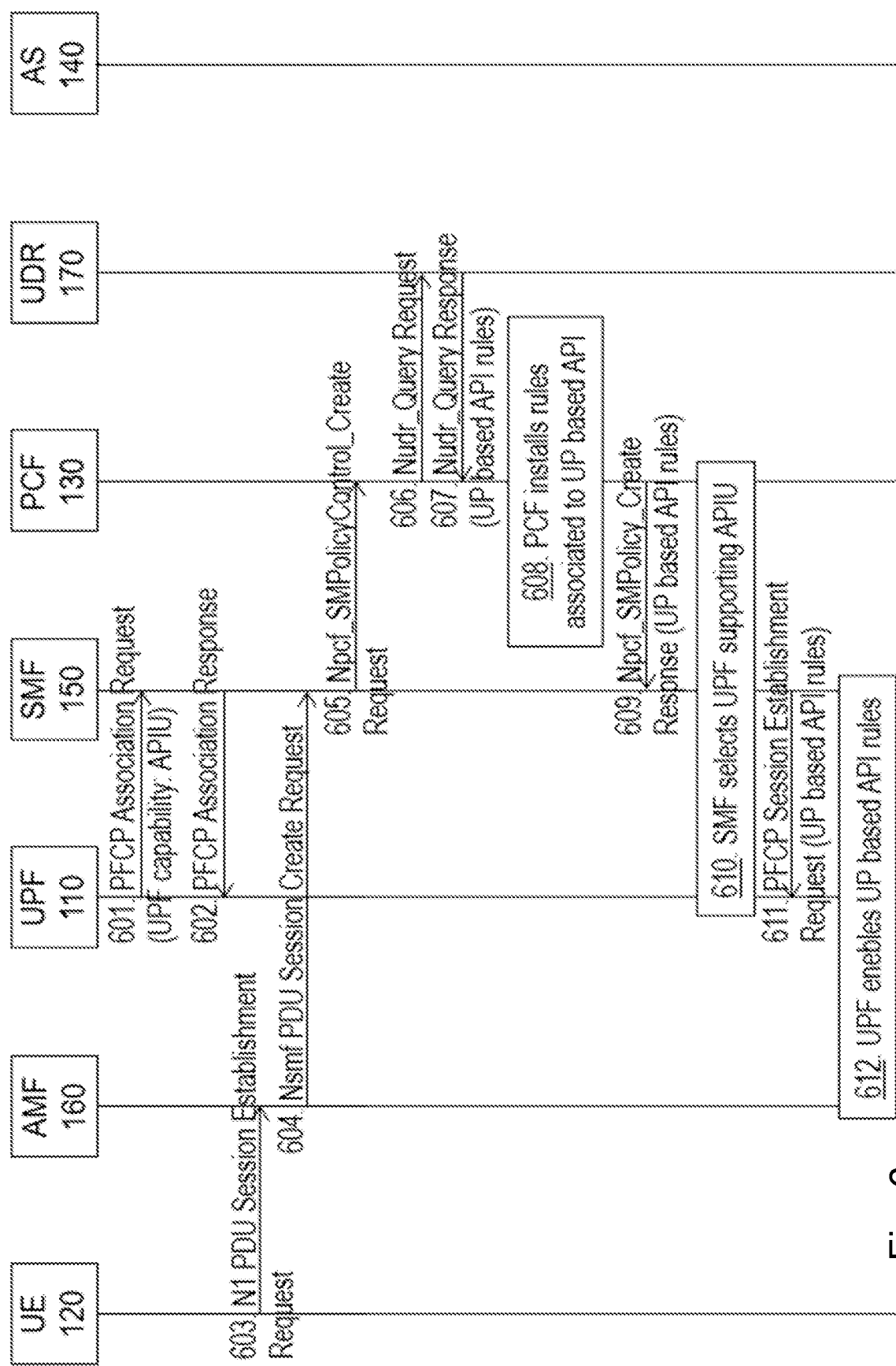
FIGS. 6 a and b are sequence diagrams depicting embodiments of a method.
Figure 6B:
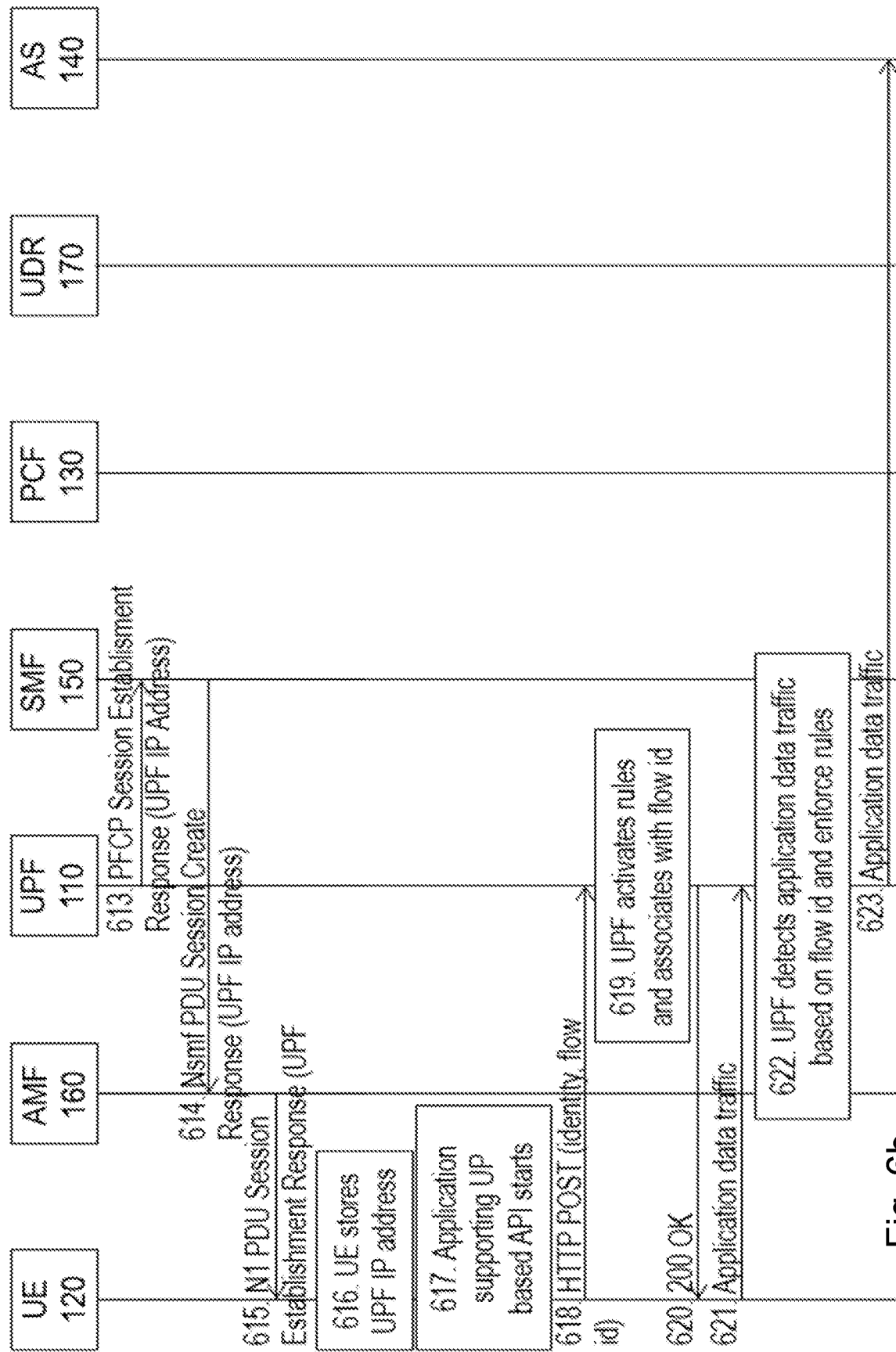

Steps 1-12 of FIG. 6a and Steps 13-23 of FIG. 6b depict examples of detailed steps for a 5G implementation according to embodiments herein. In the FIGS. 6a and b the gateway node 110 is referred to as UPF 110, the UE 120 is referred to as UE 120 the policy node 130 is referred to as PCF 130, the application server 140 is referred to as AS 140 and the session management node 150 is referred to as SMF 150.

The steps may be taken in any suitable order. Some steps are new according to embodiments herein and are marked so, and some steps are performed according prior art.

In the below example, the UE 120 is represented by a content provider. Therefore, the wording "content provider" when used in the examples below may be used interchangeably with the wording "UE 120", or the wording "UE 120 such as e.g. its content provider". According to the example there may exist a Service Level Agreement (SLA) between the UE 120 such as e.g. its content provider, and the network operator. The SLA may comprise that a UP based API is to be used for a content provider to request policies regarding the content provider's applications to be enforced by the network operator. At the network operator, this is pre-provisioned at Unified Data Repository (UDR) on a per subscriber basis as part of the subscriber policy.

The subscriber policy may include one or more rules associated to the new UP based API. Each of the one or more rules may be identified by a rule identifier. The rule identifier may refer to an application and a set of policies related to such as e.g. QoS or Charging.

Alternatively, the above may be pre-provisioned on a per group of subscribers, on a per slice basis and/or on a per global basis.

Step 601. The UPF 110 sends a message to the SMF 150. The message is a Packet Flow Control Protocol (PFCP) Association Request message comprising the indication indicating support for the UP based API. This may allow the SMF 150 to know which UPFs that support this capability and thus may influence on UPF selection. This step is related to action 401 described above.

Step 602. The SMF 150 sends a PFCP Association Response to the UPF 110 in response to the request. This may be to acknowledge the request.

Step 603. The UE 120 triggers a PDU session establishment, by means of sending a N1 PDU session establishment request to an AMF 160. This step is related to action 301 described above.

Step 604. The AMF 160 selects the SMF 150 to manage the PDU session relating to the UE 120 and sends a Nsmf PDU session create request to the SMF 150.

Step 605. The SMF 150 sends towards the PCF 130 a Npcf session management (SM) policy control create, referred to as Npcf_SMPolicyControl_Create, request message to retrieve SM policies for the PDU session relating to the UE 120. This step is related to action 301 described above.

Step 606. The PCF 130 sends towards the UDR 170 a Nudr query, referred to as Nudr_Query, request message to retrieve the policy data for the PDU session relating to the UE 120.

Step 607. The UDR 170 answers the PCF 130 with a Nudr Query response message comprising the subscriber policy data. The subscriber policy data comprises one or more rules associated to the new UP based API. Each of the one or more rules may be identified by a rule identifier. The rule identifier may refer to an application, such as e.g. appId=example.com, and a set of policies related to such as e.g. QoS or Charging.

Step 608. Based on the above subscriber policy data, the PCF 130 decides to install the one or more rules associated to the new UP based API as PCC rules for the PDU session relating to the UE 120.

Step 609. In order to do that, the PCF 130 sends to the SMF 150 a Npcf_SMPolicyControl_Create response message comprising the one or more PCC rules to be applied for the PDU session relating to the UE 120. This step is related to action 302 and 402 described above.

Step 610. If the one or more rules is associated to the new UP based API, the SMF 150 may select the UPF 110 supporting UP based API capability. This step is related to action 402 described above.

Step 611. The SMF 150 sends to the UPF 110 a PFCP Session Establishment Request message comprising the one or more rules associated to the new UP based API. This step is related to action 302 and 402 described above.

Step 612. The UPF 110 enables the UP based API for the PFCP session. The UPF 110 may store the one or more rules associated to the new UP based API and may keep them inactive until a policy request message is received.

The UPF 110 may further retrieve the address of the UP based API handling the session that will be used for UP based API requests from the content provider, such as the UE 120. This may be any one out of e.g. a URL, a FQDN or an IP address. This step is related to action 402.

Step 613. The UPF 110 responds to the SMF 150 with a successful PFCP Session Establishment Response message. The message may comprise the address of the UP based API handling the session. This step is related to action 403 and 501 described above.

Step 614. The SMF 150 responds to the Nsmf PDU Session Create Request message in Step 4 with a Nsmf PDU session create response to the AMF 160. The message may comprise the address of the new UP based API handling the session.

Step 615. The AMF 160 responds to the N1 PDU session establishment request message in Step 3 with a N1 PDU session establishment response message to the UE 120. The message may comprise the address of the new UP based API handling the session.

Step 616. The UE 120 may store the address handling the session. The address may be used as destination address for any UP based API requests during the session. This step is related to action 501 described above.

Step 617. An application with support of UP based API is started on the UE 120.

Step 618. The UE 120 sends a message to the UPF node 110. The message may be a HTTPS POST request message. The UE may use the address of the UP based API handling the session as destination address. The message comprises the identity identifying the one or more rules and a flow identifier. The flow identifier comprises flow information such as e.g. 5-tuple/s, that will assist the UPF node 110 to detect the application data traffic associated to the one or more rules. This step is related to action 303, 404 and 502 described above.

Step 619. The UPF node 110 may activate the one or more rules and associate them with the flow information. This step is related to action 304 and 405 described above.

Step 620. The UPF node 110 answers the UE 120 with a 200 OK message indicating successful operation.

Step 621. The UE 120 transmits application data traffic towards to application server 140 through the UPF node 110. This step is related to action 305 and 503 described above.

Step 622. The UPF node 110 detects application data traffic by matching it against the flow information and enforce the corresponding one or more rules. This step is related to action 306, 406 and 407 described above.

Step 623. The UPF node 110 forwards the application data traffic towards the application server 140 using the established. This step relates to action 307 described above.

Figure 7A:
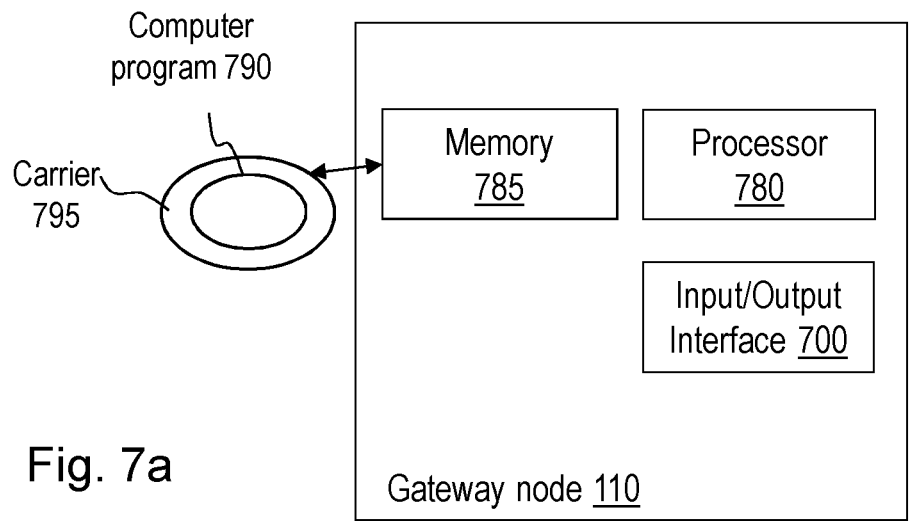
FIGS. 7 a and b are a schematic block diagrams illustrating embodiments of a policy node.
Figure 7B:
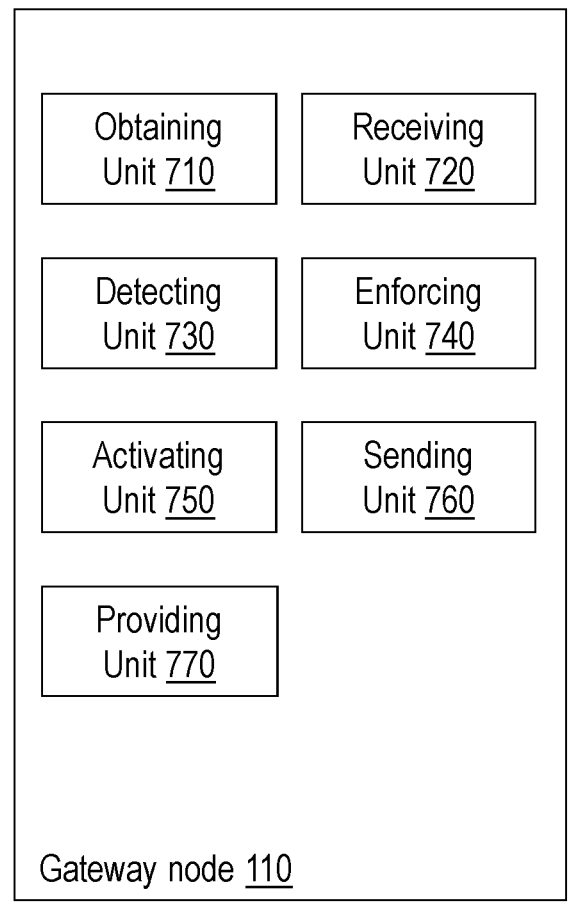

To perform the method actions, the gateway node 110 may comprise an arrangement depicted in FIGS. 7a and b. The gateway node 110 is configured to handle application data traffic of a session between the UE 120 and the application server 140 in the wireless communications network 100.

The gateway node 110 may comprise an input and output interface 700 configured to communicate with the UE 120 and with network nodes, such as e.g. the policy node 130 and the application server 140, in the wireless communications network 100.

The gateway node 110 is further configured to, e.g. by means of an obtaining unit 710 in the gateway node 110, obtain from a policy node 130, an identity identifying one or more rules provisioned for the UE 120. The identity is adapted to be associated with the session and with a UP API, to be used for the session The gateway node 110 may further be configured to, e.g. by means of the obtaining unit 710 in the gateway node 110, obtain the identity by further enable the UP based API for the session and store the identity adapted to identify the one or more rules.

The gateway node 110 may further be configured to, e.g. by means of the obtaining unit 710 in the gateway node 110, obtain the identity by further be selected by the session management node 150 to handle the session.

In some embodiments the identity is further adapted to comprise a rule identifier identifying an application associated with the rule identifier and one or more policies associated with the application.

In some embodiments the one or more rules provisioned for the UE 120 is adapted to relate to traffic policies.

The gateway node 110 is further configured to, e.g. by means of a receiving unit 720 in the gateway node 110, receive through the UP based API, a message from the UE 120. The message is adapted to comprise the identity and a flow identifier identifying the application data traffic related to the identity. The message further is adapted to request the one or more rules to be enforced by the gateway node 110.

The gateway node 110 is further configured to, e.g. by means of a detecting unit 730 in the gateway node 110, detect application data traffic associated with the flow identifier.

The gateway node 110 is further configured to, e.g. by means of a enforcing unit 740 in the gateway node 110, enforce the one or more rules for the detected application data traffic between the UE 120 and the application server 140. The one or more rules are enforced according to the obtained identity.

The gateway node 110 may further be configured to, e.g. by means of an activating unit 750 in the gateway node 110, activate the one or more rules, and associate the one or more rules with the flow identifier.

The gateway node 110 may further be configured to, e.g. by means of a sending unit 760 in the gateway node 110, send to a session management node 150, an indication indicating an address of the UP based API handling the session The address of the UP based API is may be adapted to comprise any one out a URL, a FQDN, or an IP address of the UP based API.

The gateway node 110 may further be configured to, e.g. by means of a providing unit 770 in the gateway node 110, provide to a session management node 150 an indication indicating support for the UP based API. The indication is adapted to enable the session management node 150 to select the gateway node 110 for a session using the UP based API.

Those skilled in the art will also appreciate that the units in the gateway node 110 mentioned above may refer to a combination of analog and digital circuits, and/or one or more processors configured with software and/or firmware, e.g. stored in the gateway node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 780 of a processing circuitry in the gateway node 110 depicted in FIG. 7a, together with respective computer program code for performing the functions and actions of the embodiments herein. The program code mentioned above may also be provided as a computer program product, for instance in the form of a data carrier carrying computer program code for performing the embodiments herein when being loaded into the gateway node 110. One such carrier may be in the form of a CD ROM disc. It is however feasible with other data carriers such as a memory stick. The computer program code may furthermore be provided as pure program code on a server and downloaded to the gateway node 110.

The gateway node 110 may further comprise a memory 785 comprising one or more memory units. The memory comprises instructions executable by the processor in the gateway node 110.

The memory is arranged to be used to store e.g. identities identifying rules associated to the UP based API, flow identifiers, indications, identities, rules and policies and applications to perform the methods herein when being executed in the gateway node 110.

In some embodiments, a respective computer program 790 comprises instructions, which when executed by the respective at least one processor, cause the at least one processor of the gateway node 110 to perform the actions above.

In some embodiments, a respective carrier 795 comprises the respective computer program, wherein the carrier is one of an electronic signal, an optical signal, an electromagnetic signal, a magnetic signal, an electric signal, a radio signal, a microwave signal, or a computer-readable storage medium.

Figure 8A:
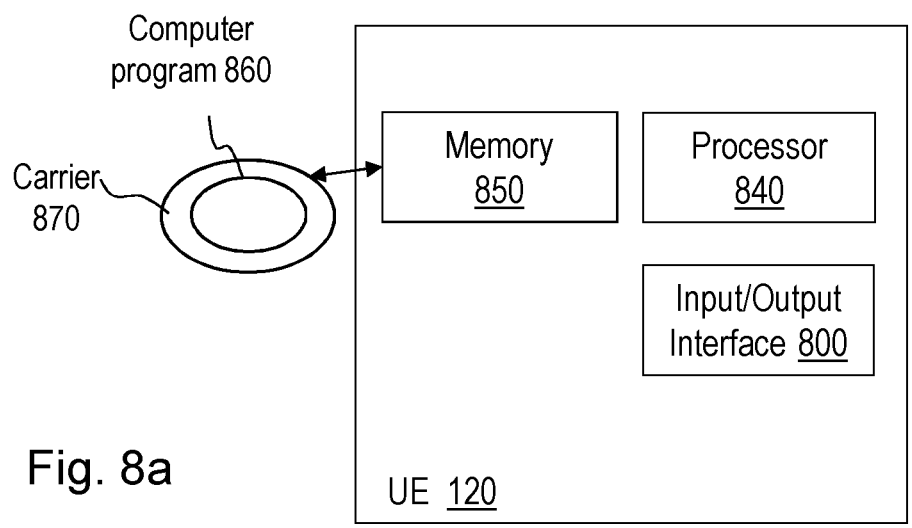
FIGS. 8 a and b are a schematic block diagrams illustrating embodiments of a user plane node.
Figure 8B:
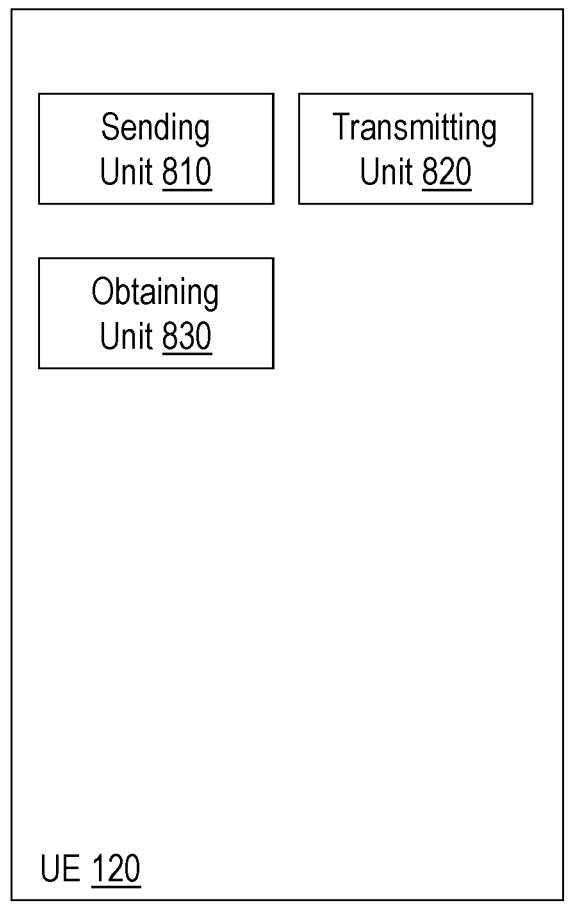

To perform the method actions, the UE 120 may comprise an arrangement depicted in FIGS. 8a and b. The UE 120 is configured to assist the gateway node 110 to handle application data traffic of a session between the UE 120 and the application server 140 in the wireless communications network 100.

The UE 120 may comprise an input and output interface 800 configured to communicate with network nodes such as e.g. the gateway node 110 in the wireless communications network 100.

The UE 120 is further configured to, e.g. by means of a sending unit 810 in the UE 120, send through the UP based API, a message towards the gateway node 110. The message is adapted to comprise an identity identifying one or more rules, and a flow identifier identifying the application data traffic related to the identity. The message is further adapted to request the one or more rules to be enforced by the gateway node 110.

The identity may be adapted to comprise a rule identifier identifying an application associated with the rule identifier and one or more policies associated with the application.

The one or more rules may be adapted to relate to traffic policies.

The UE 120 is further configured to, e.g. by means of a transmitting unit 820 in the UE 120, transmit application data traffic associated with the flow identifier towards the application server 140 through the gateway node 110. The sent flow identifier is adapted to assist the gateway node 110 to detect the transmitted application data traffic, and enforce the one or more rules for the detected application data traffic between the UE 120 and the application server 140 according to the sent identity.

The UE 120 may further be configured to, e.g. by means of an obtaining unit 830 in the UE 120, upon establishment of the session, obtain an indication from the gateway node 110. The indication may be received via a session management node 150. The indication indicates an address of the UP based API handling the one or more rules for the session.

The UE 120 may further be configured to, e.g. by means of the obtaining unit 830 in the UE 120, obtain the indication by further store the address of the UP based API handling the one or more rules for the session.

The address of the UP based API may be adapted to comprise any one out a URL, a FQDN, or an IP address of the UP based API.

The address may further be adapted to be used as destination address for sending the message to the UP based API.

Those skilled in the art will also appreciate that the units in the UE 120 mentioned above may refer to a combination of analog and digital circuits, and/or one or more processors configured with software and/or firmware, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The embodiments herein may be implemented through a respective processor or one or more processors, such as a processor 840 of a processing circuitry in the UE 120 depicted in FIG. 8a, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The user UE 120 may further comprise a memory 850 comprising one or more memory units. The memory 850 comprises instructions executable by the processor in the UE 120.

The memory is arranged to be used to store e.g. identities identifying rules associated to the UP based API, flow identifiers, indications, identities, rules and policies applications for communication with application servers, and applications to perform the methods herein when being executed in the UE 120.

In some embodiments, a respective computer program 860 comprises instructions, which when executed by the respective at least one processor 840, cause the at least one processor 840 of UE 120 to perform the actions above.

In some embodiments, a respective carrier 870 comprises the respective computer program, wherein the carrier is one of an electronic signal, an optical signal, an electromagnetic signal, a magnetic signal, an electric signal, a radio signal, a microwave signal, or a computer-readable storage medium.

Further Extensions and Variations

Figure 9:
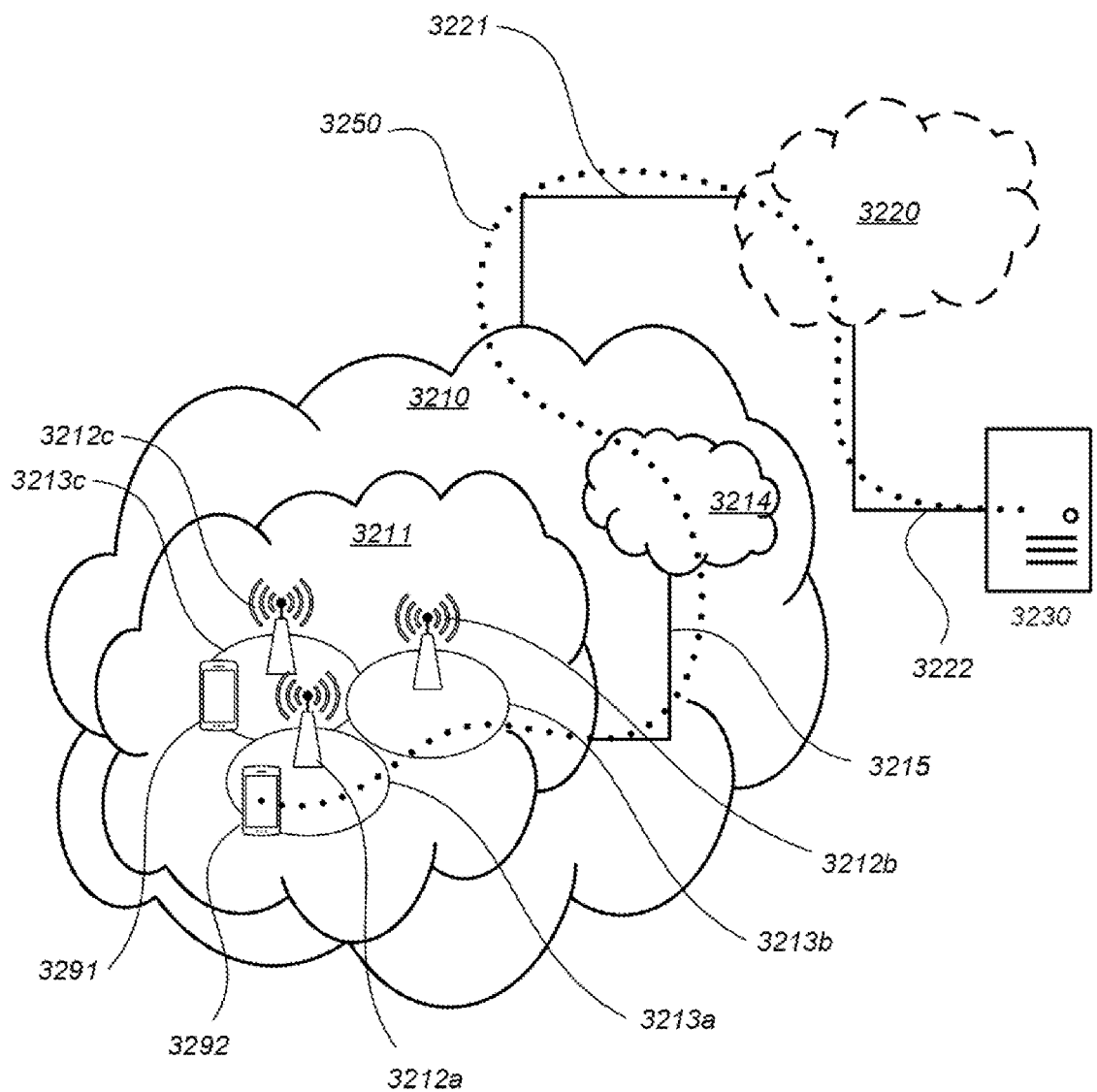
FIG. 9 schematically illustrates a telecommunication network connected via an intermediate network to a host computer.

With reference to FIG. 9, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the network node 105, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 10 may be identical to the host computer 3230, one of the base stations 3212*a*, 3212*b*, 3212*c* and one of the UEs 3291, 3292 of FIG. 9, respectively. This is to say, the inner workings of these entities may be as shown in FIG. 10 and independently, the surrounding network topology may be that of FIG. 9.

Figure 10:
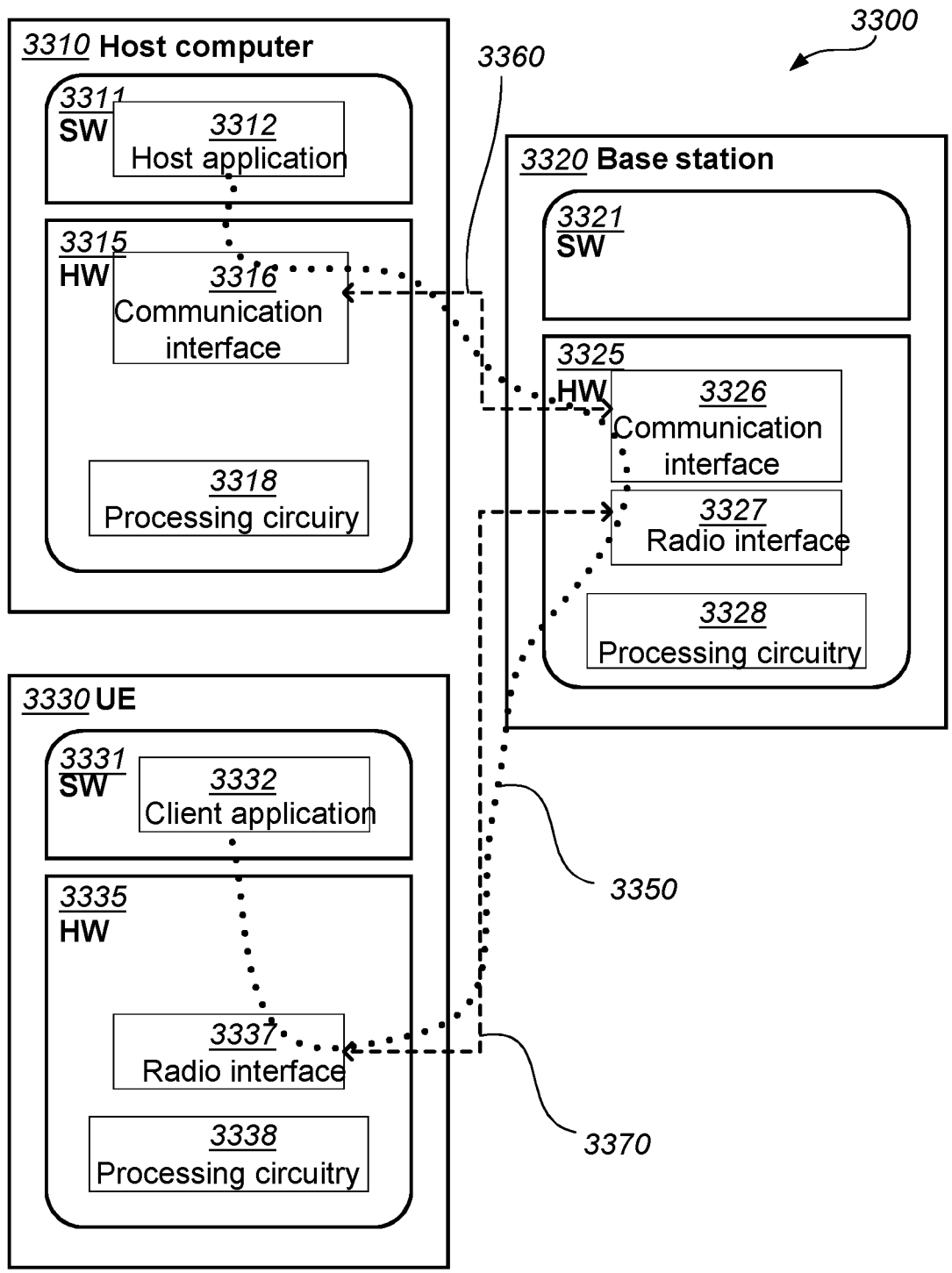
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 12 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 13 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 14 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used

The invention claimed is:

1. A method performed by a gateway node, for handling application data traffic of a session between a User Equipment, UE, and an application server in a wireless communications network, the method comprising:
    upon establishing the session, obtaining from a policy node, an identity identifying one or more rules provisioned for the UE, which identity is associated with the session and with a User Plane, UP, based Application Programming Interface, API, to be used for the session, receiving through the UP based API, a message from the UE, which message comprises the identity and a flow identifier identifying the application data traffic related to the identity, and which message requests the one or more rules to be enforced by the gateway node, and upon detecting application data traffic associated with the flow identifier, enforcing the one or more rules, according to the obtained identity, for the detected application data traffic between the UE and the application server.

2. The method according to claim 1, further comprising:
    activating the one or more rules, and associate the one or more rules with the flow identifier.

3. The method according to claim 1, further comprising: upon establishing the session, sending to a session management node, an indication indicating an address of the UP based API handling the session.

4. The method according to claim 1, further comprising:
    providing to a session management node an indication indicating support for UP based API, which indication enables the session management node to select the gateway node for a session using the UP based API.

5. The method according to claim 1, wherein the obtaining the identity further comprises enabling the UP based API for the session and storing the identity identifying the one or more rules.

6. The method according to claim 1, wherein the identity comprises a rule identifier, which rule identifier identifies an application associated with the rule identifier and one or more policies associated with the application.

7. The method according to claim 1, wherein the one or more rules provisioned for the UE relates to traffic policies.

8. A method performed by a User Equipment, UE, assisting a gateway node in handling application data traffic of a session between the UE and an application server in a wireless communications network, the method comprising:
    sending through a User Plane, UP, based Application Programming Interface, API, a message towards the gateway node, which message comprises an identity identifying one or more rules, and a flow identifier identifying the application data traffic related to the identity, and which message requests the one or more rules to be enforced by the gateway node, and
    transmitting application data traffic associated with the flow identifier towards the application server through the gateway node, which sent flow identifier assist the gateway node to detect the transmitted application data traffic, and enforce the one or more rules for the detected application data traffic between the UE and the application server according to the sent identity.

9. The method according to claim 8, further comprising:
    upon establishing the session, obtaining from the gateway node, via a session management node, an indication indicating an address of the UP based API handling the one or more rules for the session.

10. The method according to claim 9, wherein the obtaining the indication further comprises storing the address of the UP based API handling the one or more rules for the session.

11. The method according to claim 8, wherein the identity comprises a rule identifier, which rule identifier identifies an application associated with the rule identifier and one or more policies associated with the application.

12. A gateway node, configured to handle application data traffic of a session between a User Equipment, UE, and an application server in a wireless communications network, the gateway node being further configured to:
    upon establishment of the session, obtain from a policy node, an identity identifying one or more rules provisioned for the UE, which identity is adapted to be associated with the session and with a User Plane, UP, based Application Programming Interface, API, to be used for the session,
    receive through the UP based API, a message from the UE, which message is adapted to comprise the identity and a flow identifier identifying the application data traffic related to the identity, and which message further is adapted to request the one or more rules to be enforced by the gateway node, and
    detect application data traffic associated with the flow identifier, and enforce the one or more rules, according to the obtained identity, for the detected application data traffic between the UE and the application server.

13. The gateway node according to claim 12, further being configured to:
    activate the one or more rules, and associate the one or more rules with the flow identifier.

14. The gateway node according to claim 12, further being configured to:
    upon establishment of the session, send to a session management node, an indication indicating an address of the UP based API handling the session.

15. The gateway node according to claim 12, further being configured to:
    provide to a session management node an indication indicating support for UP based API, which indication is adapted to enable the session management node to select the gateway node for a session using the UP based API.

16. The gateway node according to claim 12, further being configured to obtain the identity by further enable the UP based API for the session and store the identity adapted to identify the one or more rules.

17. The gateway node according to claim 12, wherein the identity is adapted to comprise a rule identifier identifying an application associated with the rule identifier and one or more policies associated with the application.

18. A User Equipment, UE, configured to assist a gateway node to handle application data traffic of a session between a the UE and an application server in a wireless communications network, the UE being further configured to:
    send through a User Plane, UP, based Application Programming Interface, API, a message towards the gateway node, which message is adapted to comprise an identity identifying one or more rules, and a flow identifier identifying the application data traffic related to the identity, and which message further is adapted to request the one or more rules to be enforced by the gateway node, and transmit application data traffic associated with the flow identifier towards the application server through the gateway node, which sent flow identifier is adapted to assist the gateway node to detect the transmitted application data traffic, and enforce the one or more rules for the detected application data traffic between the UE and the application server according to the sent identity.

19. The UE according to claim 18, further being configured to:

upon establishment of the session, obtain from the gateway node, via a session management node an indication indicating an address of the UP based API handling the one or more rules for the session.

20. The UE according to claim 18, wherein the identity is adapted to comprise a rule identifier identifying an application associated with the rule identifier and one or more policies associated with the application.

* * * * *